United States Patent
Arnet et al.

(10) Patent No.: US 7,695,666 B2
(45) Date of Patent: Apr. 13, 2010

(54) METHOD AND DEVICE FOR SEPARATING A CAST LENS FROM A SHELL MOLD

(75) Inventors: Roman Arnet, Ennetbuergen (CH); Urs Probst, Zug (CH)

(73) Assignee: Interglass Technology AG, Cham (CH)

( * ) Notice: Subject to any disclaimer, the term of this patent is extended or adjusted under 35 U.S.C. 154(b) by 942 days.

(21) Appl. No.: 10/574,601

(22) PCT Filed: May 13, 2005

(86) PCT No.: PCT/EP2005/052205

§ 371 (c)(1),
(2), (4) Date: Apr. 4, 2006

(87) PCT Pub. No.: WO2005/113221

PCT Pub. Date: Dec. 1, 2005

(65) Prior Publication Data

US 2007/0052117 A1    Mar. 8, 2007

(30) Foreign Application Priority Data

May 18, 2004   (EP) ................................. 04102204

(51) Int. Cl.
*B29C 45/42* (2006.01)
(52) U.S. Cl. ..................... 264/334; 425/422; 425/444
(58) Field of Classification Search ................. 264/334; 425/408, 418, 422, 423, 441, 444, 808
See application file for complete search history.

(56) References Cited

U.S. PATENT DOCUMENTS

| | | | |
|---|---|---|---|
| 4,251,474 A | 2/1981 | Blandin | |
| 6,039,899 A | * 3/2000 | Martin et al. | 264/1.36 |
| 6,171,529 B1 | 1/2001 | de Marignan et al. | |

FOREIGN PATENT DOCUMENTS

WO      02/087861      11/2002

OTHER PUBLICATIONS

English Translation of the International Preliminary Report on Patentability for International Application No. PCT/EP2005/052205, date of mailing Dec. 4, 2006.

* cited by examiner

*Primary Examiner*—Joseph S Del Sole
*Assistant Examiner*—James Sanders
(74) *Attorney, Agent, or Firm*—Nixon Peabody LLP; David B. Ritchie

(57) ABSTRACT

The invention relates to a method for separating a cast lens from shell molds, whereby a separating tool exerts pressure on the lens but a height of the separating tool is guided along the interface between the lens and the shell mold to be separated from the lens. In a preferred embodiment the composite consisting of the lens and the shell molds is fixed on a holding device that can be rotated on an axis of rotation. The holding device is rotated by means of a first motor and the height of the separating tool is tracked by means of a second motor in relation to the height of the interface depending on the angle of rotation.

9 Claims, 4 Drawing Sheets

METHOD AND DEVICE FOR SEPARATING A CAST LENS FROM A SHELL MOLD

CROSS REFERENCE TO RELATED APPLICATIONS

The present application is related to and claims priority of the PCT application number PCT/EP2005/052205 entitled Method and device for separating a cast lens from a shell mold, filed May 13, 2005, the disclosure of which is herein incorporated by reference, which in turn claims priority of the European patent application number 04102204.7 filed May 18, 2004.

TECHNICAL FIELD

The invention concerns a method for separating a cast lens from a shell mold and a device suitable for doing so.

TECHNICAL BACKGROUND

A production line for the production of optical lenses is known from the international patent application WO 02/087861. With this production method a monomer is cast and polymerised in a cavity framed by two shell molds and a seal whereby the lens is formed. Afterwards, the seal is removed and the lens separated from the two shell molds in a separating device. The two shell molds are separated from the lens one after the other. The separating device consists of a holding device that secures the lens, a force transmitter that exerts a force on the lens, preferably at the interface between the lens and the shell mold, and a second force transmitter that exerts a force on the shell mold.

Separating the lens from the two shell molds is a tricky process with which there is a great danger that the lens and/or the shell molds are damaged or destroyed during the separation process. For this reason, separation is still done by hand, the separation process of WO 02/087861 was not reliable. In U.S. Pat. No. 4,251,474, a spatula is mentioned that is used to separate the lens from the shell molds.

BRIEF DESCRIPTION OF THE INVENTION

The object of the invention is to develop a method and a device that enable separation of the lens from the two shell molds without damaging the lens or the shell molds.

The two shell molds are generally referred to as front and rear shell mold. However, with this method it is of no importance, which of the two shell molds is designated as the front and which as the rear shell mold. The side of a shell mold facing towards the lens is designated as the active side and the side facing away from the lens is designated the passive side.

To separate the lens from the two shell molds, a method is proposed with which the separating tool is guided with a force on the lens along the interface between the lens and the shell mold to be separated from the lens. The separating tool is preferably blunt and rolls on the lens as far as possible without gliding or sliding on the lens. It is only a matter of relative movements:

Either the separating tool or the composite of lens and shell mold can be adjusted corresponding to the position of the interface.

During the separation process, the separating tool presses against the lens with a predefined force or the lens is pressed against the separating tool with a predefined force.

Either the composite of lens and shell mold is rotated and the separating tool rolls passively on the lens or the separating tool is rotated and the lens rolls passively on the separating tool.

The separation process takes place preferably in that the gripper exerts a tensile force on the passive side of the front shell mold provided that this is to be separated, or on the lens provided that the lens is to be separated from the rear shell mold. However, with certain lenses it may be necessary that, at the start of the separation process, the gripper first exerts a compressive force on the shell mold or the lens and the compressive force is only reduced and a tensile force built up during the course of the separation process but before the lens and the shell mold to be separated are completely separated from each other. During the separation process, tensile and compressive force can also be applied alternately in accordance with a specific profile in order to support the separation process.

Furthermore, the gripper can exert a shear force, i.e. a laterally aligned force, on the shell mold or the lens in addition to or instead of the tensile and compressive force.

A device particularly suited for carrying out the method comprises a holding device, driven by a first motor, that can be rotated on a first axis of rotation that secures the rear shell mold, a gripper, preferably a suction gripper that exerts a tensile force on the front shell mold or, after its removal, on the lens, a separation tool that can be rotated on a second axis of rotation that is pressed laterally against the lens by means of a force transmitter, a second motor in order to adjust a height H of the separating tool measured along the first axis of rotation, and a control unit that controls the second motor so that the height H of the separating tool follows the interface between the shell mold to be separated and the lens that in doing so however presses on the lens and not on the shell mold to be separated.

The rotational position of the shell mold is characterised by an angle of rotation $\theta$. The shell mold has a marking for the angle of rotation $\theta=0°$. Before the separation process can be carried out, the rotational position of the shell mold to be separated and the height of the interface between the shell mold to be separated and the lens have to be known as a function of the angle of rotation $\theta$. In addition, the azimuthal position $\theta_s$ of the separating tool has to be known.

The edge of a shell mold facing towards the interface is defined mathematically by a function $R(\theta)$ that describes the distance of the edge in relation to a reference position of the shell mold as a function of the angle of rotation $\theta$. The function $R(\theta)$ is either determined for each shell mold by means of a measurement and stored in a memory accessible to the control unit or acquired during the separation process by means of a sensor.

The position of the interface $H_v(\theta)$ between the front shell mold and the lens results as $H_v(\theta)=H_1-R_v(\theta)$, whereby the height $H_1$ designates the height of the reference position of the front shell mold when the composite of the lens and the two shell molds is secured on the holding device, and the function $R_v(\theta)$ designates the function $R(\theta)$ assigned to the front shell mold. The position of the interface $H_h(\theta)$ between the rear shell mold and the lens results as $H_h(\theta)=H_2+R_h(\theta)$, whereby the height $H_2$ designates the height of the reference position of the rear shell mold when the composite is secured on the holding device and the function $R_h(\theta)$ designates the function $R(\theta)$ assigned to the rear shell mold. Before the separation process, the height $H_1$ has to be acquired by means of a measurement because, on curing, the lens undergoes a certain shrinkage unless the lens consists of a material that does not shrink on curing. As a rule, the height $H_2$ is constant and therefore only has to be determined once on calibration of the separating device.

The interface between the shell mold to be separated and the lens is characterised by a mathematical function without expansion while the separating tool has a finite thickness or expansion. On separating the front shell mold from the lens, the height of the separating tool is controlled as a function of the angle of rotation θ to a height $H_v(θ)-ΔH_0$, whereby the constant $ΔH_0$ designates an offset value adapted to the thickness of the separating tool. The constant $ΔH_0$ amounts for example to 0.3 mm. On separating the rear shell mold from the lens, the height of the separating tool is controlled as a function of the angle of rotation θ to a height $H_v(θ)+ΔH_0$. In this way it is guaranteed in both cases that the separating tool always presses on the lens adjacent to the interface between the shell mold to be separated and the lens and follows the interface, but the separating tool does not press on the shell mold.

There are lenses that have a flat. The flat can for example be due to the casting. In order to avoid damage with such lenses, the force exerted by the separating tool is reduced, preferably to the value zero, when the flat is located in the area of the separating tool.

The separation process can be supported by the delivery of a parting compound in the form of a liquid, for example a soap solution, a gas or a powder or a mixture of these. Furthermore, the parting compound can be cold in order to cause a cooling of the lens. Alternatively, the parting compound can be hot in order to support the separation process.

The force exerted on the lens by the separating tool can be orientated orthogonal to the side wall of the lens or at a constant or variable angle dependent on the angle of rotation θ.

In the following, the invention is explained in more detail based on an embodiment and based on the drawing.

BRIEF DESCRIPTION OF THE DRAWING FIGURES

FIG. 1 shows a side view of a device for separating a cast lens from a front and a rear shell mold, FIGS. 2, 3 show a side view and a cross-sectional view of parts of the device, FIG. 4 shows a plan view of a lens, FIGS. 5-7 show different force profiles, and FIGS. 8, 9 show further devices for separating a cast lens from the shell molds.

DETAILED DESCRIPTION OF THE INVENTION

FIG. 1 shows schematically a side view of a device for separating a cast lens 1 from a front shell mold 2 and a rear shell mold 3. The two shell molds 2, 3 and the lens 1 represent a composite 4. The device comprises a holding device 7 driven by a first motor 6 and rotatable on an axis of rotation 5 that secures the rear shell mold 3 of the composite 4, a gripper 8 preferably formed as a suction gripper that exerts a force, a compressive force or a tensile force, on the front shell mold 2 or, after its removal, on the lens 1, a separating tool 9 that is pressed laterally against the lens 1 by means of a force transmitter, a second motor 11 in order to adjust a height H of the separating tool 9 measured along the first axis of rotation 5, and a control unit 12 that controls the second motor 11 depending on the angle of rotation θ of the shell mold to be separated in such a way that the separating tool 9 always presses against the lens 1 immediately adjacent to the interface 13 between the shell mold 2 or 3 to be separated and the lens 1, i.e. that the height H of the separating tool 9 is adjusted to the height of the interface 13. Optionally, the device comprises one or several counterpressure rollers 14 that counter the force exerted by the separating tool 9. If two counterpressure rollers 14 are present, they are arranged symmetrically in relation to the direction of the force that is exerted on the lens 1 by the separating tool 9.

The gripper 8 bears on a robot arm 15, preferably by means of a spring 16. In addition, the gripper 8 bears on a second axis of rotation 17 on which it can be rotated so that the gripper 8 can rotate with the front shell mold 2 when the first motor 6 rotates the holding device 7 with the composite 4 on the first axis of rotation 5. Ideally, the axis of rotation 17 coincides with the axis of rotation 5. However, as this is not accurately achievable because of unavoidable tolerances, the gripper 8 bears on the robot arm 15 with a certain radial play; Instead of the bearing via the spring 16, a pneumatic bearing of the gripper 8 on the robot arm 15 could also be foreseen. With this solution, the force to be exerted by the gripper 8 can be adjusted pneumatically.

The force transmitter 10 is preferably a piston 20 controlled pneumatically by means of two pressure chambers 18, 19. The pressure in the first pressure chamber 18 is for example constant and the pressure in the second pressure chamber 19 is controlled by a valve. The difference in the pressure prevailing in the two pressure chambers 18, 19 defines the force exerted by the piston 20.

The maximum deflection of the force transmitter 10 is limited by a stop in order to ensure that, if, during the separation process, the lens 1 and the shell mold are deformed and a gap develops between the lens 1 and the shell mold 2 or 3 to be separated, the separating tool 9 does not come into contact with the shell mold to be separated as otherwise the shell mold could be damaged.

FIG. 2 shows a side view of the holding device 7, the gripper 8 and the separating tool 9, FIG. 3 shows a cross-section of the same parts. In FIG. 2 the course of the two interfaces 13 is visible. The curve on which the separating tool 9 is guided is each represented by a dotted line 21 or 22.

The holding device 7 includes a guide 23 (FIG. 3), on which the passive side 24 of the rear shell mold 3 rests and a deformable sealing element 25 that seals a cavity 26 formed between the holding device 7 and the rear shell mold 3.

The front and rear shell mold 2 and 3 each include a marking 28 (a so-called Tabo line, FIG. 2) that serves as reference for the angle of rotation, e.g. characterises the angle of rotation θ=0°. As a rule, the passive side of the shell molds 2, 3 is a spherical surface 29 (FIG. 3) that changes into a flat surface section 30 at the edge. This flat surface section 30 is badly suited as reference surface for the function R(θ) that characterises the height of the edge of the active side of the shell mold. Therefore, definition and determination of the function R(θ) preferably takes place in relation to the spherical surface 29 and is explained in more detail based on the example of the rear shell mold 3 but is valid in the same way for the front shell mold 2. The rear shell mold 3 is placed on the guide 23 of the holding device 7. The guide 23 is a torus the size of which is dimensioned so that the spherical surface of the passive side 24 comes to rest on the guide 23 in the area of its edge. In doing so, the shell mold is placed on the holding device 7 in such a way that it is orientated as symmetrically as possible in relation to the axis of rotation 5. The holding device 7 is now rotated until the marking 28 assumes a predefined position. The holding device 7 is now rotated once by 360° and in doing so the height of the edge 31 of the active side 32 is measured as a function of the angle of rotation θ by means of a sensor and stored as the function $R(\theta)$. This measurement has to be carried out only once. It is preferably done in a special measuring station that contains a holding device similar to the holding device 7. Another possibility exists in that an additional marking 36 is applied to the edge of the shell mold that serves as reference for the function $R(\theta)$.

The separating tool 9 is preferably a disc rotatable on an axis 33, the edge of which is blunt so that the disc does not cut into the lens 1. The edge of the disc is for example about 0.5 mm wide. The axis 33 is a passive axis so that the edge of the disc rolls on the lens 1 without gliding or sliding when the first motor 6 rotates the composite 4. The axis 33 of the separating tool 9 is preferably inclined by a predetermined angle $\alpha$ in relation to the axis of rotation 5 so that the force exerted on the lens 1 by the separating tool 9 has a component supporting the tensile force of the gripper 8. By definition, the tensile force of the gripper 8 is aligned along the axis of rotation 5 and in the direction away from the holding device 7.

Separation of the lens 1 from the two shell molds 2, 3 takes place in accordance with the following process steps each of which is described in detail:

1. The composite 4 comprising the two shell molds 2, 3 and the lens 1 is placed on the holding device 7 and secured to it. The robot arm 15 places the composite 4 accurately in position on the guide 23 of the holding device 7 whereby the passive side 24 of the rear shell mold 3 rests on the guide 23 of the holding device 7. Placement is done so that the passive side is aligned as symmetrically as possible to the axis of rotation 5. In doing so, the sealing element 25 and/or a bellows 34 carrying the sealing element 25 is deformed. Vacuum is now applied to the cavity 26 so that the composite 4 is secured on the holding device 7.

2. The rotational position of the composite 4 is adjusted so that the marking 28 of the front shell mold 2 assumes a predetermined rotational position $\theta=0°$. The first motor 6 now rotates the holding device 7 until the marking 28 of the front shell mold 2 assumes a predetermined rotational position. The angle $\theta=0°$ is assigned to this rotational position. A first (not presented) sensor is present for detection of the marking 28. The position of the interface $H_v(\theta)$ between the front shell mold 2 and the lens 1 is not only dependent on the front shell mold 2 but also on the thickness of the lens 1, i.e., on the distance between the two shell molds 2, 3. If the lens 1 shrinks on curing, the course of the interface $H_v(\theta)$ between the front shell mold 2 and the lens 1 can not be calculated but has to be determined by a measurement by means of a second (not presented) sensor. If however the lens 1 does not shrink on curing, the course of the interface $H_v(\theta)$ between the front shell mold 2 and the lens 1 can be calculated.

3. The height $H_1$ is acquired which the reference position of the passive side of the front shell mold 2 assumes. Determining the height $H_1$ is done by means of a third sensor 35 in the form of a position sensor. The position sensor is for example a control switch that is lowered and closes an electrical contact as soon as the control switch touches the passive side of the front shell mold 2. As soon as the electrical contact closes, the control switch transmits its actual position to the control unit 12 as height $H_1$. The control switch is positioned so that it acquires the height $H_1$ at that position of the passive side of the front shell mold 2 at which the passive side rested on the guide 23 of the holding device 7 on determining the function $R(\theta)$. If the front shell mold 2 has the marking 36, then the height of the marking 36 is determined as the height $H_1$. In this case, the third sensor 35 is an optical sensor that is not arranged above the composite 4 but laterally adjacent to the composite 4.

The control unit 12 gets the function $R(\theta)=R_v(\theta)$ assigned to the front shell mold 2 from a memory accessible to it that describes the distance of the edge of the front shell mold 2 from a reference position on the passive side as a function of the angle $\theta$. The course of the interface 13 between the front shell mold 2 and the lens 1 is given by $H_v(\theta)=H_1-R_v(\theta)$.

4. The separating tool 9 is positioned correctly in height and pressed laterally against the lens 1.

The control unit 12 now calculates the value $H_v(\theta=\theta_s)$ and drives the second motor 11 so that the separating tool 9 assumes the height $H_v(\theta_s)-\Delta H_0$ whereby the angle $\theta_s$ designates the azimuthal position of the separating tool 9 and the constant $\Delta H_0$ designates an offset value corresponding to the thickness of the separating tool 9. Afterwards, a predetermined differential pressure is applied to the piston 20 of the force transmitter 10 so that the separating tool 9 now presses against the lens 1 immediately underneath the interface 13 between the front shell mold 2 and the lens 1.

5. A tensile force is applied to the front shell mold 2. The robot arm 15 is raised by a predetermined distance. Because the composite 4 held by the gripper 8 is now secured on the holding device 7, the spring 16 is deflected and the gripper 8 exerts a tensile force on the front shell mold 2 defined by the degree of deflection of the spring 16 and its spring constant. Alternatively, a compressive force is first applied to the front shell mold 2. However, during the following process step 6—before the lens (1) and the shell mold (2, 3) to be separated are completely detached from each other—the compressive force is reduced and a tensile force is built up.

These process steps served the preparation. The actual separation process to separate the front shell mold 2 from the lens 1 can now be carried out. In doing so it must be kept in mind that the height $H_v(\theta)$ refers to the lens 1 whereby the angle $\theta=0°$ corresponds to the position of the marking 28 that however the separating tool 9 has the azimuthal angle $\theta_s$. Therefore, an angle transformation is necessary that additionally has to take into consideration the rotational direction of the holding device 7.

If the lens is almost circular, then the actual separation process takes place in accordance with the following process step:

6. The control unit 12 causes the first motor 6 to turn and controls the second motor 11 so that the height $H_{1st}$ of the separating tool 9 assumes the height $H_v(\theta_s-\theta)-\Delta H_0$ corresponding to the actual angle of rotation $\theta$ of the front shell mold 2.

The control unit 12 and the first motor 6 work together in a known way so that the angle of rotation $\theta$ of the front shell mold 2 is known to the control unit 12.

FIG. 4 shows a plan view of a lens 1 with a flat 37. The edge of the lens 1 is circular over a wide angle range $\phi$ and straight within the complementary angle range $360°-\phi$. This straight section corresponds to the flat. The angle $\theta_1$ at which the straight section begins, and the angle $\theta_2$ at which the straight section ends are actually known, however, not very accurately. A certain risk exists that the front shell mold 2 or the lens 1 will be damaged at the ends of the flat 37. In order to eliminate this risk, the force produced by the force transmitter 10 is either greatly reduced, preferably to the value zero, or the separating tool 9 is even raised from the composite 4 each time and so long as the flat 37 is located in the area of the separating tool 9, i.e. for angle $\theta_1<\theta<\theta_2$ or for angle $\theta_1-\delta<\theta<\theta_2+\delta$, whereby the angle $\delta$ represents a small tolerance angle that makes allowance for the inaccuracy with which the angles $\theta_1$ and $\theta_2$ are known.

If the lens 1 contains such a flat 37, then separation preferably takes place in accordance with the following process step:

6'. The control unit 12 causes the first motor 6 to turn and first controls the second motor 11 so that the height $H_{1st}$ of the separating tool 9 takes the height $H_v(\theta_s-\theta)-\Delta H_0$ corresponding to the actual angle of rotation θ of the front shell mold 2 and secondly controls the force F exerted by the force transmitter 10 in accordance with a predetermined profile $F(\theta_s-\theta)$ dependent on the angle of rotation θ.

FIG. 5 shows a first example of a force profile F(θ). The angle of rotation θ naturally covers a range of 0° to 360°. The force F is constant in the ranges 0° to $\beta_1$ and $\beta_2$ to 360°, whereby the angle $\beta_1$ is $<\theta_1$ and the angle $\beta_2$ is $>\theta_2$. In the range $\beta_1$ to $\theta_1$ the force F is reduced to the value zero, in the range $\theta_2$ to $\beta_2$ the force is again built up to the constant value.

Figure 1:
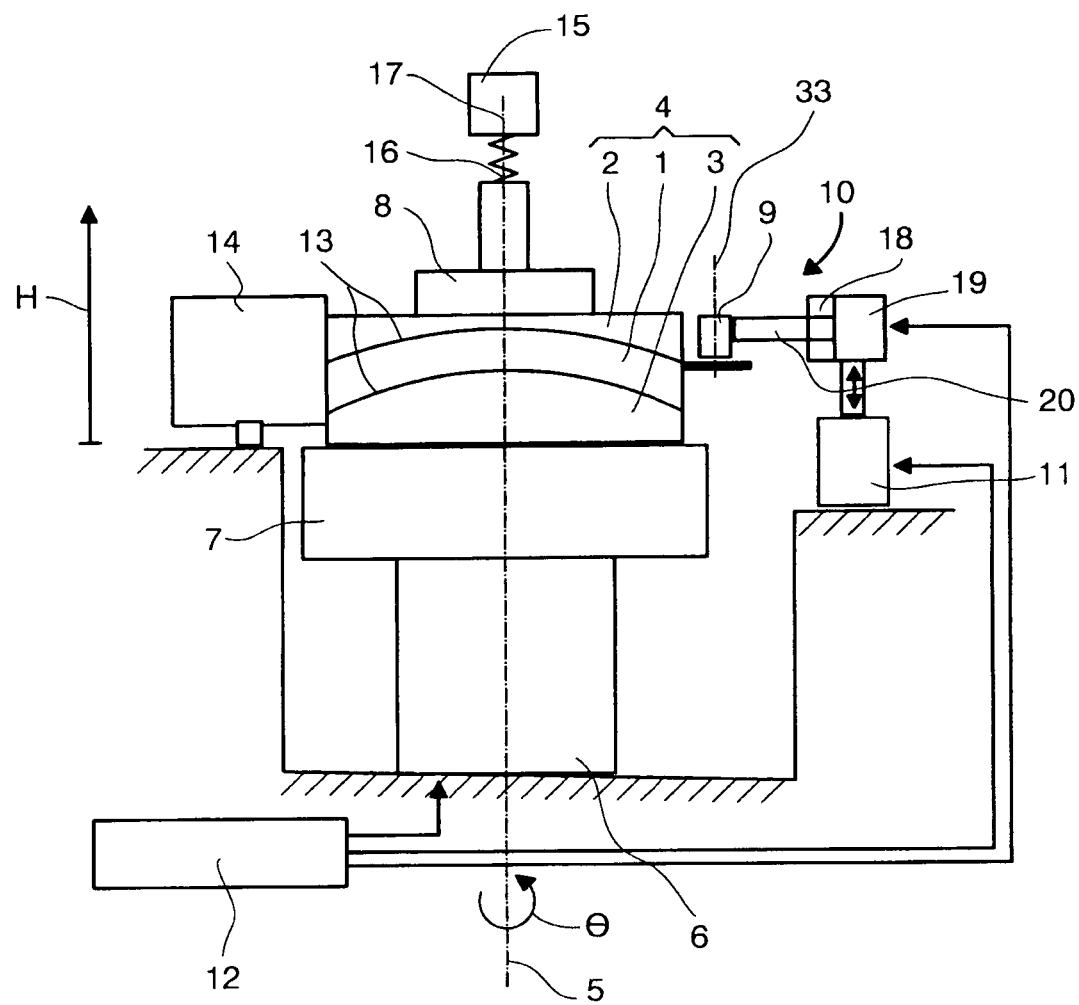
Figure 2:
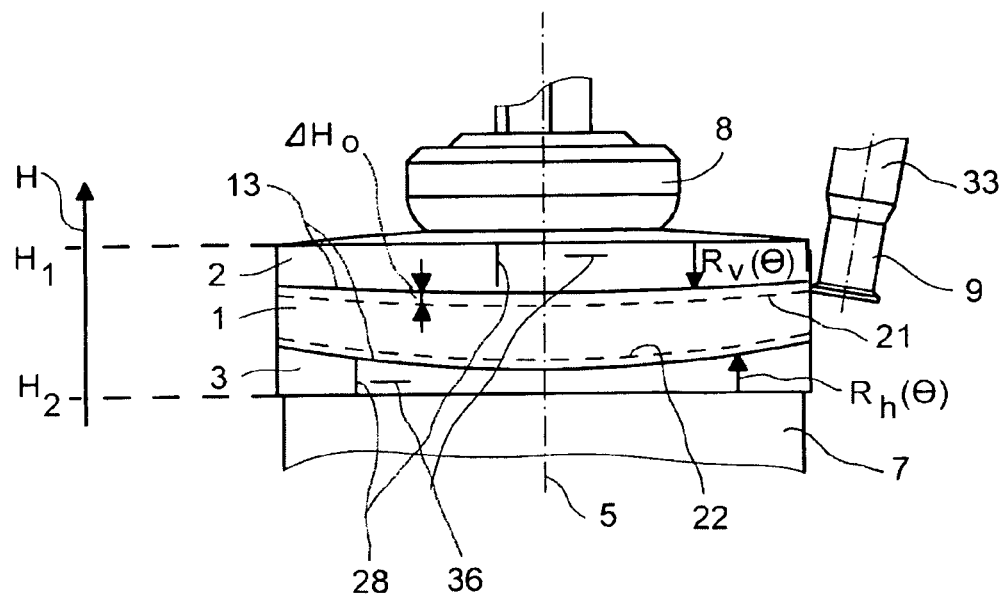
Figure 3:
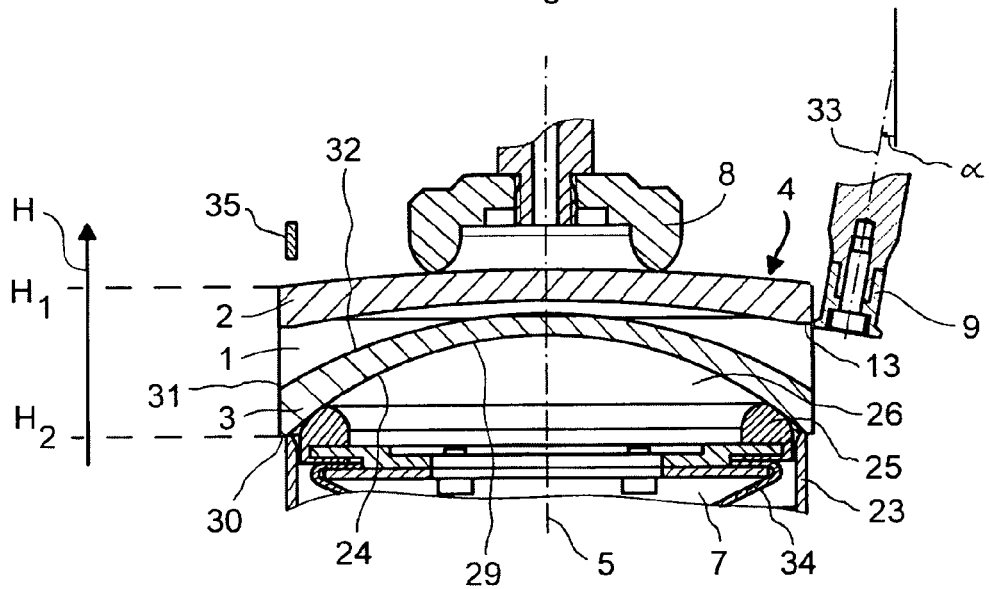
Figure 4:
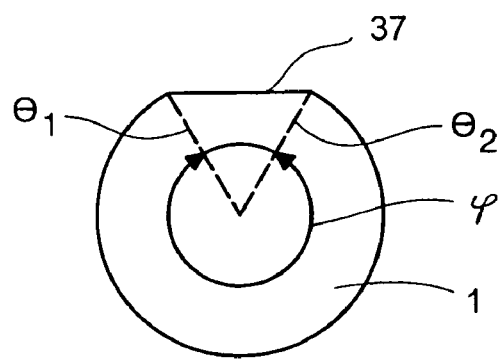
Figure 5:
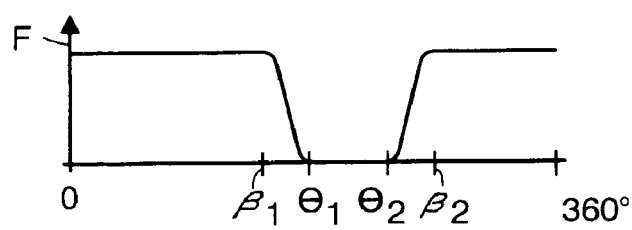
Figure 6:
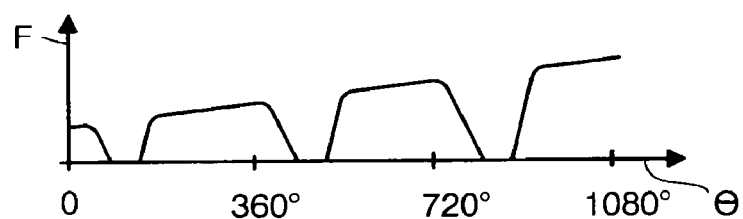
FIG. 6 shows a second example of a force profile F(θ) with which the applied force increases continuously over several rotations (presented are 3*360°) of the holding device 7.
Figure 7:
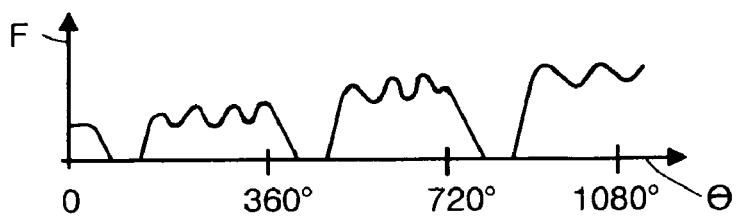
FIG. 7 shows a third example of a force profile F(θ) with which the applied force additionally has a portion of vibration.

When the separation process is finished, the front shell mold 2 raises up from the lens 1 as a result of the tensile force exerted by the gripper 8. In this way, it is guaranteed that the lens 1 cannot be scratched as soon as the lens 1 and the front shell mold 2 are separated from one another. As soon as a sensor detects this raising, the control unit 12 stops the first motor 6 and moves the force transmitter 10 to its neutral position in which the separating tool 9 no longer touches the composite 4. The robot arm 15 deposits the detached front shell mold 2 onto a conveyor belt.

Separation of the lens 1 from the rear shell mold 3 now takes place in a similar way. The control unit 12 gets the function $R(\theta)=R_h(\theta)$ assigned to the rear shell mold 3 from the memory that describes the distance of the edge of the rear shell mold 3 from its passive side as a function of the angle θ. The height $H_2$ of the rear shell mold 3 is defined by the height $H_2$ of the guide 23 of the holding device 7 and does not have to be determined each time. The course of the interface between the rear shell mold 3 and the lens 1 is given by $H_h(\theta)=H_2+R_h(\theta)$. However, if the rear shell mold 3 has the marking 36, then the height of the marking 36 is determined as the height $H_2$.

7. The rotational position of the composite 4 is adjusted so that the marking 28 of the rear shell mold 3 assumes a predetermined rotational position θ=0°.

8. The separating tool 9 is positioned at the height $H_h(\theta=\theta_s)+\Delta H_0$ and pressed against the composite 4.

9. The gripper 8 makes contact with the lens 1 and exerts a force, as a rule a tensile force, on the lens 1.

The actual separation process for separating the lens 1 from the rear shell mold 3 can now be carried out:

10. The control unit 12 causes the first motor 6 to turn and controls the second motor 11 so that the height $H_{1st}$ of the separating tool 9 assumes the height $H_h(\theta_s-\theta)+\Delta H_0$ corresponding to the actual angle of rotation θ of the rear shell mold 3.

Or, for lenses with a flat 37:

10. The control unit 12 causes the first motor 6 to turn and first controls the second motor 11 so that the height $H_{1st}$ of the separating tool 9 assumes the height $H_h(\theta_s-\theta)+\Delta H_0$ corresponding to the actual angle of rotation θ of the rear shell mold 3 and secondly controls the force F exerted by the force transmitter 10 according to a predetermined profile $F(\theta_s-\theta)$ dependent on the angle of rotation θ.

When the separation process is finished, the lens 1 raises up from the rear shell mold 3 as a result of the tensile force exerted by the gripper 8. As soon as the sensor detects this raising, the control unit 12 stops the first motor 6 and moves the force transmitter 10 to its neutral position. The robot arm 15 deposits the lens 1 and then the rear shell mold 3 onto the conveyor belt.

If the separation process is to be supported by the introduction of a parting agent, then a nozzle is arranged adjacent to the separating tool 9 that feeds the parting agent onto the surface processed by the separating tool 9.

In the example, the quantity $\Delta H_0$ was a constant. However, the quantity $\Delta H_0$ can also be a quantity $\Delta H_0(\theta)$ dependent on the angle of rotation θ. In this way, during the separation process, an increasing deformation of the shell mold to be separated can also be taken into consideration.

The device described distinguishes itself with a simple construction. However, as it is only a matter of a relative movement when the separating tool has to follow the interface 13 between the shell mold to be separated and the lens, the height of the separating tool 9 could also be held constant and the height of the holding device 7 be designed to be adjustable. Furthermore, the force transmitter 10 could act on the holding device 7 or on a counterpressure roller 14 (and not on the separating tool 9) in order to produce the force that is to act on the lens 1 by the separating tool 9. During the separation process the course of the interface 13 can also be measured by means of a sensor whereby the output signal of the sensor is processed by the control unit 12 and transformed into a positioning command for the motor 11 of the separating tool 9. Furthermore, the force transmitter 10 could act on the holding device 7 or on a counterpressure roller 14 (and not on the separating tool 9) in order to produce the force that is to act on the lens 1 by the separating tool 9. During the separation process or the course of the interface 13 can also be measured by means of a sensor whereby the output signal of the sensor is processed by the control unit 12 and transformed into a positioning command for the motor 11 of the separating tool 9.

With the device described, the first motor 6 rotates the holding device 7 and the separating tool 9 is rotated passively with it. Conversely, the first motor 6 could rotate the separating tool 9 and rotate the holding device 7 passively with it.

The device described has two counterpressure rollers 14 and one single separating tool 9. However it is also possible to provide more than one separating tool, for example two or three, and to reduce the number of counterpressure rollers. In doing so, the height of each separating tool is controlled individually by the control unit 12 corresponding to its azimuthal position and the angle of rotation θ of the shell mold 2 or 3 to be separated.

Figure 8:
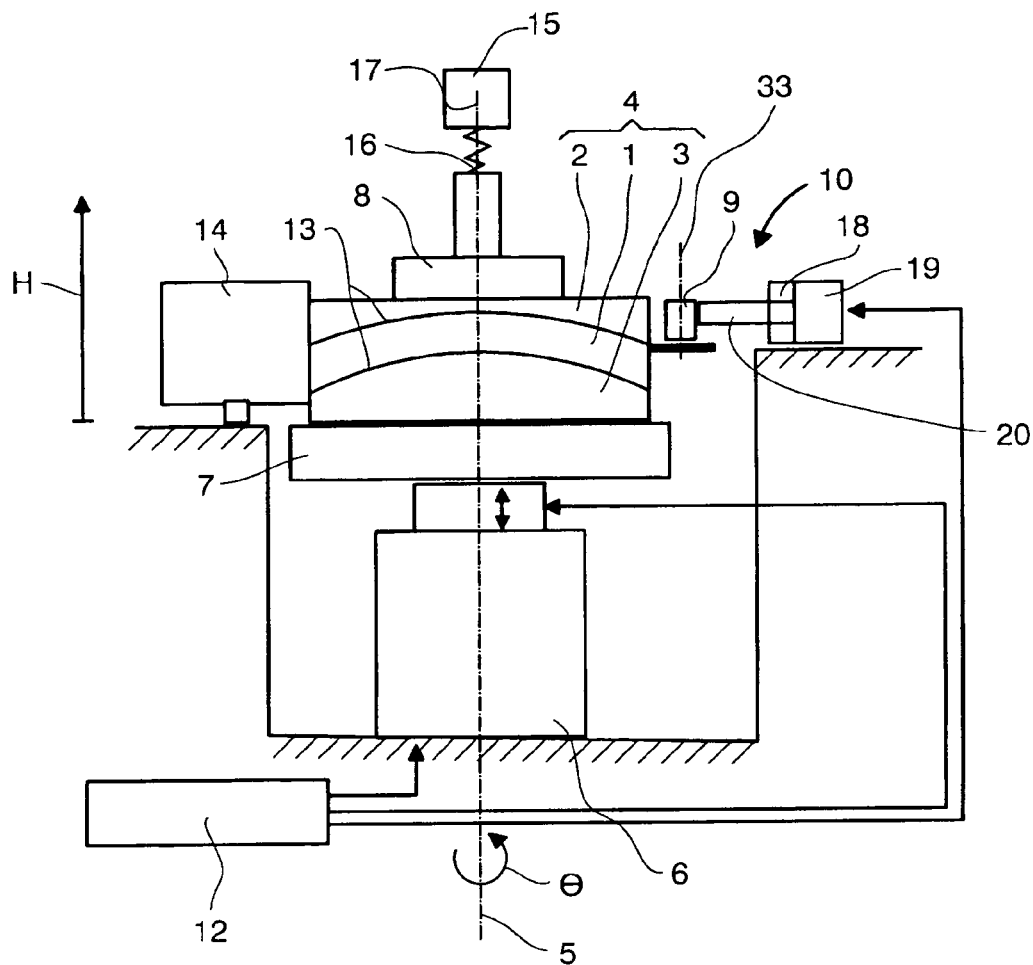

FIG. 8 shows a further device with which the separating tool 9 assumes a fixed height and the second motor 11 can adjust the height H of the holding device 7.

Figure 9:
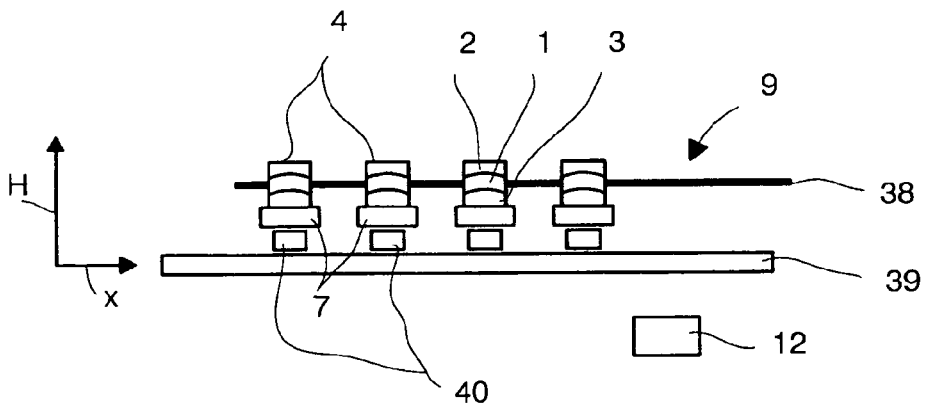

FIG. 9 shows a device designed as a continuous station for separating cast lenses from their shell molds. The device includes a separating tool 9 with a fixed height H in the form of a straight preferably blunt blade 38 and several holding devices 7 for accommodating one complete composite 4 each or a composite 4 one shell mold of which has already been separated. The holding devices 7 are transported by a linear conveyor drive 39 parallel to the separating means 38 in the direction marked with x, whereby the lenses 1 are pressed against the separating means 38 (or the separating means 38 against the lenses 1) and roll on the separating means 38. The height H of each holding device 7 is individually adjustable by means of a motor 40 integrated into the holding device 7.

The control unit 12 controls the height H of every single holding device 7 individually so that the height of each holding device 7 follows the interface between the lens 1 and the shell mold 2 or 3 to be separated corresponding to its actual angle of rotation. In addition, a (not presented) gripper is assigned to each holding device 7 that exerts a tensile, compressive and/or shear force on the front shell mold 2 or on the lens 1. At the input side of the device, the robot passes the composite 4 to a holding device 7.

For illustrative purposes, currently preferred embodiments of the invention has been presented and described here however numerous variations and modifications are possible that remain within the concept and scope of this invention.

Here, explicit reference is again made to the fact that in the claims it makes no difference which of the two shell molds is designated as the rear shell mold and which as the front shell mold.

What is claimed is:

1. A method for separating a cast lens from a shell mold, the shell mold and the lens forming a composite, the method comprising:
    fixing the composite onto a holding device rotatable on an axis of rotation wherein the angle of rotation of the shell mold is designated as angle of rotation $\theta$;
    adjusting a height of a separating tool and applying a force to the separating tool so that the separating tool presses against the lens adjacent to an interface between the shell mold and the lens; and
    rotating the holding device and continuously adjusting the height of the separating tool so that the separating tool follows a height of the interface according to the actual angle of rotation $\theta$.

2. The method according to claim 1, further comprising:
    applying a further force to either the shell mold or the lens, wherein the further force is a tensile force that is already built up at the start of the separation process or is built up at least before the lens and the shell mold are completely separated from each other.

3. A device for separating a lens cast between a front and a rear shell mold from the two shell molds, the device comprising:
    a holding device rotatable on a first axis of rotation, on which the rear shell mold can be fixed, whereby a rotational position of the shell mold to be separated is characterised by an angle of rotation $\theta$;
    a gripper rotatable on a second axis of rotation for exerting a force on the front shell mold or, after its removal, on the lens;
    a separating tool rotatable on a third axis of rotation;
    a force transmitter for pressing the separating tool laterally against the lens;
    a first motor for rotating the holding device or the separating tool;
    a second motor for adjusting a height H of the separating tool or the holding device, the height measured along the first rotational axis; and
    a control unit that controls the second motor so that the separating tool presses on the lens adjacent to an interface between the shell mold to be separated and the lens, whereby a height H of the separating tool or the holding device follows a height of the interface between the shell mold to be separated and the lens according to the angle of rotation $\theta$.

4. The device according to claim 3, wherein the control unit controls the force exerted by the force transmitter according to a profile dependent on the angle of rotation $\theta$.

5. The device according to claim 3, wherein the third axis of rotation of the separating tool is inclined by a predetermined angle in relation to the first axis of rotation.

6. The device according to claim 5, wherein the third axis of rotation of the separating tool is adjustable in relation to the first axis of rotation.

7. The device according to claim 4, wherein the third axis of rotation of the separating tool is inclined by a predetermined angle in relation to the first axis of rotation.

8. The device according to claim 7, wherein the third axis of rotation of the separating tool is adjustable in relation to the first axis of rotation.

9. A device for separating a cast lens from a shell mold, the shell mold and the lens forming a composite, the device comprising:
    a separating tool with a straight separating means;
    several holding devices rotatable on an axis and on each of which a composite can be fixed, each holding device comprising a motor for adjusting a height of the holding device relative to the separating means;
    a linear conveyor drive that transports the holding devices parallel to the separating means, whereby the lenses roll on the separating means; and
    a control unit that individually controls the motors of the holding devices so that a height of the lens follows a height of an interface between the lens and the shell mold.

\* \* \* \* \*